United States Patent
Oh et al.

(10) Patent No.: US 10,911,133 B2
(45) Date of Patent: Feb. 2, 2021

(54) COMMUNICATION METHOD AND APPARATUSES PERFORMING THE SAME

(71) Applicant: ELECTRONICS AND TELECOMMUNICATIONS RESEARCH INSTITUTE, Daejeon (KR)

(72) Inventors: Jonggyu Oh, Daejeon (KR); Pansoo Kim, Daejeon (KR); Deock Gil Oh, Daejeon (KR); Joon Gyu Ryu, Daejeon (KR); Soo Yeob Jung, Sejong (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 87 days.

(21) Appl. No.: 16/181,149

(22) Filed: Nov. 5, 2018

(65) Prior Publication Data
US 2020/0052778 A1 Feb. 13, 2020

(30) Foreign Application Priority Data

Aug. 10, 2018 (KR) .................. 10-2018-0093672

(51) Int. Cl.
| | |
|---|---|
| *H04B 7/185* | (2006.01) |
| *H04B 7/212* | (2006.01) |
| *H04W 72/04* | (2009.01) |
| *H04W 84/06* | (2009.01) |
| *H04B 7/155* | (2006.01) |
| *H04W 56/00* | (2009.01) |

(52) U.S. Cl.
CPC ......... *H04B 7/18513* (2013.01); *H04B 7/155* (2013.01); *H04B 7/2125* (2013.01); *H04W 56/001* (2013.01); *H04W 72/046* (2013.01); *H04W 84/06* (2013.01)

(58) Field of Classification Search
CPC .... H04B 7/185–18597; H04W 72/046; H04W 84/06
See application file for complete search history.

(56) References Cited

U.S. PATENT DOCUMENTS

| | | | |
|---|---|---|---|
| 2007/0150796 A1 | 6/2007 | Kim et al. | |
| 2010/0039985 A1 | 2/2010 | Kim et al. | |
| 2017/0111912 A1* | 4/2017 | Keshet | H04B 7/18513 |
| 2017/0141906 A1* | 5/2017 | Rainish | H04L 5/0073 |

(Continued)

OTHER PUBLICATIONS

"Digital Video Broadcasting (DVB), Second generation framing structure, channel coding and modulation systems for Broadcasting, Interactive Services, News Gathering and other broadband satellite applications; Part 2: DVB-S2 Extensions (DVB-S2X)", Draft ETSI EN 302 307-2 V1.1.1, Oct. 2014, p. 1-139, European Telecommunications Standards Institute.

*Primary Examiner* — Marcus Smith

(57) ABSTRACT

Disclosed is a communication method performed between a satellite and a ground station and apparatuses performing the communication method. The communication method includes transmitting a plurality of frames based on a beam allocation time schedule (BATS) between a satellite and a ground station, and synchronizing the BATS based on a reception time and a detection time of one or more frames among the plurality of frames to be received through a beam open window (BOW) allocated to the ground station.

16 Claims, 16 Drawing Sheets

(56) References Cited

U.S. PATENT DOCUMENTS

2017/0181160 A1* 6/2017 Corbel ................. H04B 17/336
2019/0199428 A1* 6/2019 Regunathan ....... H04B 7/18515
2019/0222303 A1* 7/2019 Lucky ................ H04B 7/18582

* cited by examiner

10

Frame

COMMUNICATION METHOD AND APPARATUSES PERFORMING THE SAME

CROSS-REFERENCE TO RELATED APPLICATION(S)

This application claims the priority benefit of Korean Patent Application No. 10-2018-0093672 filed on Aug. 10, 2018, in the Korean Intellectual Property Office, the disclosure of which is incorporated herein by reference for all purposes.

BACKGROUND

1. Field

One or more example embodiments relate to a communication method performed between a satellite and a ground station, and apparatuses performing the communication method.

2. Description of Related Art

An existing satellite communication network may provide a satellite communication service using a satellite beam. For example, once a service area receiving a satellite communication service provided by a satellite payload is determined, a satellite beam may be fixedly allocated to the determined service area.

An existing satellite communication service using such a set beam may have a constant data transmission quantity per beam because a bandwidth per satellite payload is set.

The existing satellite communication service may fixedly allocate a beam with a set bandwidth to a service area and may thus have a reduced frequency usage efficiency. For example, an existing satellite communication network may equally allocate a set beam to service areas, irrespective of the number of subscribers, for example, whether a service area is an area having a relatively great number of subscribers and an area such as a desert having a relatively small number of subscribers, to provide a satellite communication service.

SUMMARY

An aspect provides technology for synchronizing a beam allocation time schedule (BATS) between a satellite and a central station, for example, a ground station, only using a reception time and a detection time of a frame.

Another aspect also provides technology for tracking a departure from a synchronized BATS.

Still another aspect also provides technology for synchronizing a BATS between a satellite and a ground station and maintaining the synchronized BATS without increasing a hardware complexity, and providing a communication service more accurately.

According to an aspect, there is provided a communication method including transmitting a plurality of frames based on a BATS between a satellite and a ground station, and synchronizing the BATS based on a reception time and a detection time of one or more frames among the plurality of frames to be received through a beam open window (BOW) allocated to the ground station.

The synchronizing may include adjusting a first time offset in frame transmission occurring in a first BATS interval based on a reception time and a detection time of first one or more frames to be received by the ground station through a BOW allocated to the ground station in the first BATS interval, and finely adjusting a second time offset in frame transmission occurring in a second BATS interval based on a reception time and a detection time of second one or more frames to be received by the ground station through a BOW allocated to the ground station in the second BATS interval.

The transmitting may include transmitting a first plurality of frames corresponding to the first BATS interval, and transmitting a second plurality of frames corresponding to the second BATS interval. Herein, indices of the first plurality of frames may be all the same as to a first index.

An index of a first frame among the second plurality of frames may be a second index.

In addition, indices of remaining frames among the second plurality of frames excluding the first frame may be all the same as to a third index.

The first index and the second index may be detectable in the ground station.

The first index and the second index may be the same.

The adjusting of the first time offset may include obtaining a transmission time of the first plurality of frames corresponding to the first BATS interval, counting a first cumulative time from the transmission time of the first plurality of frames to the detection time of the first one or more frames, counting a second cumulative time from the reception time of the first one or more frames to the detection time of the first one or more frames, calculating the first time offset based on a difference between the first cumulative time and the second cumulative time, and adjusting a transmission time of the second plurality of frames corresponding to the second BATS interval using the first time offset.

The fine adjusting of the second time offset may include counting a third cumulative time from the reception time of the second one or more frames to the detection time of the second one or more frames, calculating the second time offset based on the third cumulative time, and adjusting a transmission time of a plurality of frames corresponding to a subsequent BATS interval using the second time offset.

The synchronizing may further include determining whether the BATS is synchronized by comparing, to an allowable time offset range, a cumulative time from the reception time of the second one or more frames to the detection time of the second one or more frames.

The second BATS interval may include a plurality of successive BATS intervals subsequent to the first BATS interval.

In the plurality of BATS intervals, the fine adjusting and the determining of whether the BATS is synchronized may be performed using a reception time and a detection time of one or more frames to be received through a BOW allocated to the ground station in the plurality of BATS intervals.

The allowable time offset range may be a time range to be determined based on a length of a header field of a frame and half a length of a dummy field of the frame.

The communication method may include transmitting a plurality of data frames including data based on the synchronized BATS, and tracking a departure from the synchronized BATS based on an allowable time offset range during transmission of the plurality of data frames.

Herein, the plurality of frames may not include data.
The tracking may include determining whether one or more frames received through a BOW allocated to the ground station on the synchronized BATS are detected, and determining a departure from the synchronized BATS by comparing, to the allowable time offset range, a cumulative time from a reception time of the one or more frames to a detection time of the one or more frames, when the one or more frames are detected.

According to another aspect, there is provided a communication apparatus including a modulator configured to transmit a plurality of frames based on a BATS between a satellite and a ground station, and a synchronizer configured to synchronize the BATS based on a reception time and a detection time of one or more frames among the plurality of frames to be received through a BOW allocated to the ground station.

The synchronizer may be configured to adjust a first time offset in frame transmission occurring in a first BATS interval based on a reception time and a detection time of first one or more frames to be received by the ground station through a BOW allocated to the ground station in the first BATS interval, and finely adjust a second time offset in frame transmission occurring in a second BATS interval based on a reception time and a detection time of second one or more frames to be received through a BOW allocated to the ground station in the second BATS interval.

The modulator may be configured to transmit a first plurality of frames corresponding to the first BATS interval and transmit a second plurality of frames corresponding to the second BATS interval.

Herein, indices of the first plurality of frames may be all the same as to a first index.

An index of a first frame among the second plurality of frames may be a second index.

In addition, indices of remaining frames among the second plurality of frames excluding the first frame may be all the same as to a third index.

The synchronizer may be configured to obtain a transmission time of the first plurality of frames corresponding to the first BATS interval, count a first cumulative time from the transmission time of the first plurality of frames to the detection time of the first one or more frames, count a second cumulative time from the reception time of the first one or more frames to the detection time of the first one or more frames, calculate the first time offset based on a difference between the first cumulative time and the second cumulative time, and adjust a transmission time of the second plurality of frames corresponding to the second BATS interval using the first time offset.

The synchronizer may be configured to count a third cumulative time from the reception time of the second one or more frames to the detection time of the second one or more frames, calculate the second time offset based on the third cumulative time, and adjust a transmission time of a plurality of frames corresponding to a subsequent BATS interval using the second time offset.

The synchronizer may be configured to determine whether the BATS is synchronized by comparing, to an allowable time offset range, a cumulative time from the reception time of the second one or more frames to the detection time of the second one or more frames.

The second BATS interval may include a plurality of successive BATS intervals subsequent to the first BATS interval.

In the BATS intervals, the fine adjusting and the determining of whether the BATS is synchronized may be performed using a reception time and a detection time of one or more frames to be received through a BOW allocated to the ground station in the BATS intervals.

The allowable time offset range may be determined based on a length of a header field of a frame and half a length of a dummy field of the frame.

The modulator may be configured to transmit a plurality of data frames including data based on the synchronized BATS.

The synchronizer may be configured to track a departure from the synchronized BATS based on an allowable time offset range during transmission of the plurality of data frames.

The plurality of frames may not include data.

The synchronizer may be configured to determine whether one or more frames received through a BOW allocated to the ground station on the synchronized BATS are detected, and determine a departure from the synchronized BATS by comparing, to the allowable time offset range, a cumulative time from a reception time of the one or more frames to a detection time of the one or more frames, when the one or more frames are detected.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
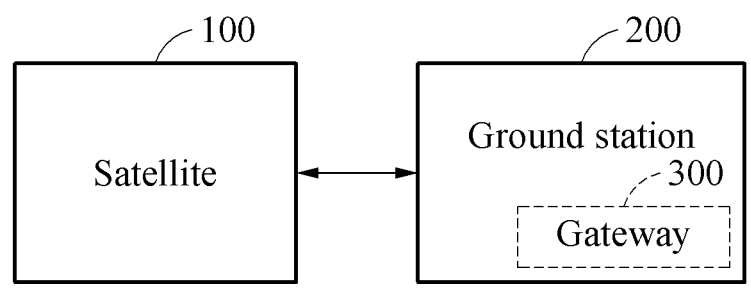
FIG. 1 is a diagram illustrating an example of a communication system according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 2:
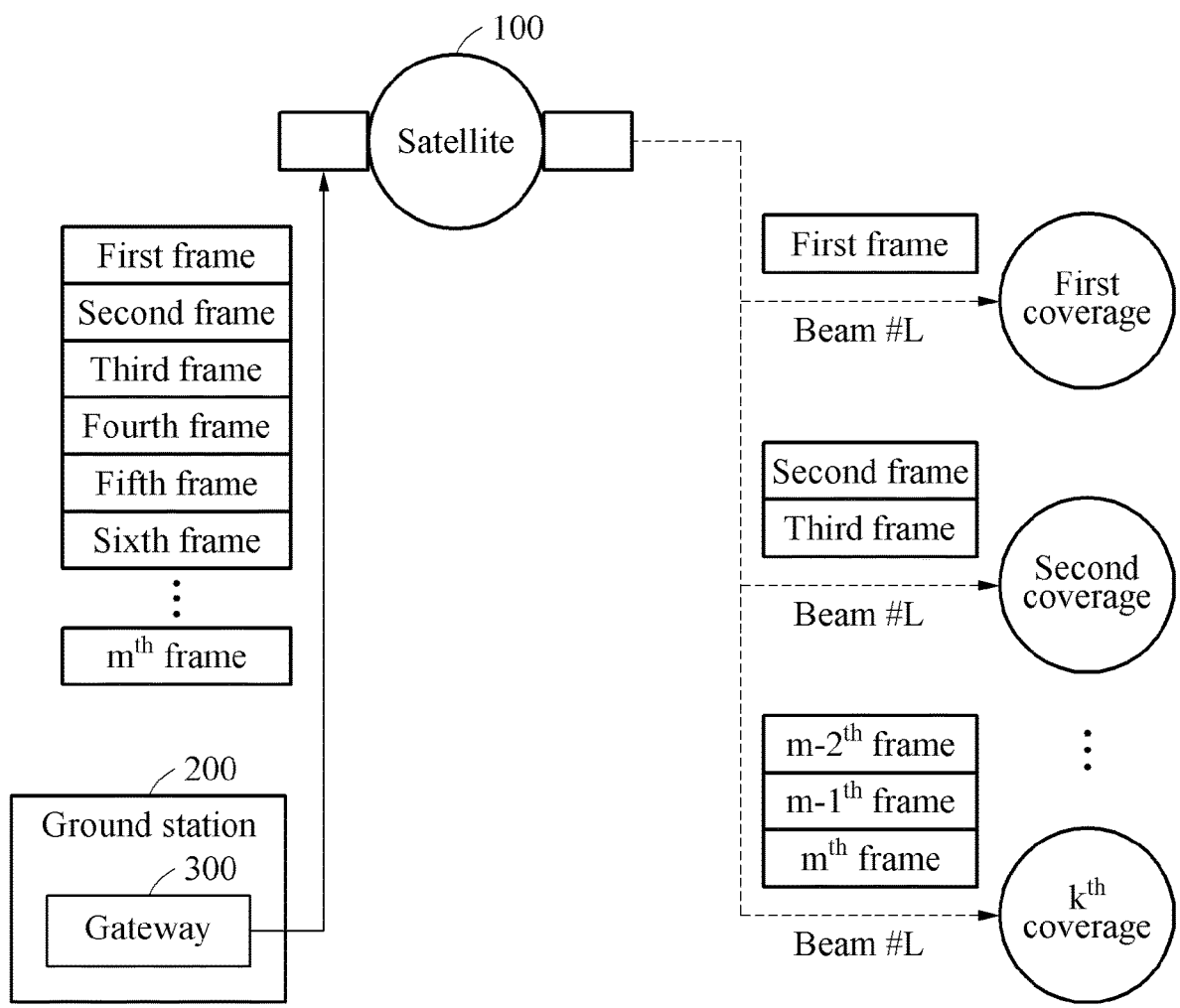
FIG. 2 is a diagram illustrating an example of operations of a ground station and a satellite illustrated in FIG. 1.
Figure 3:
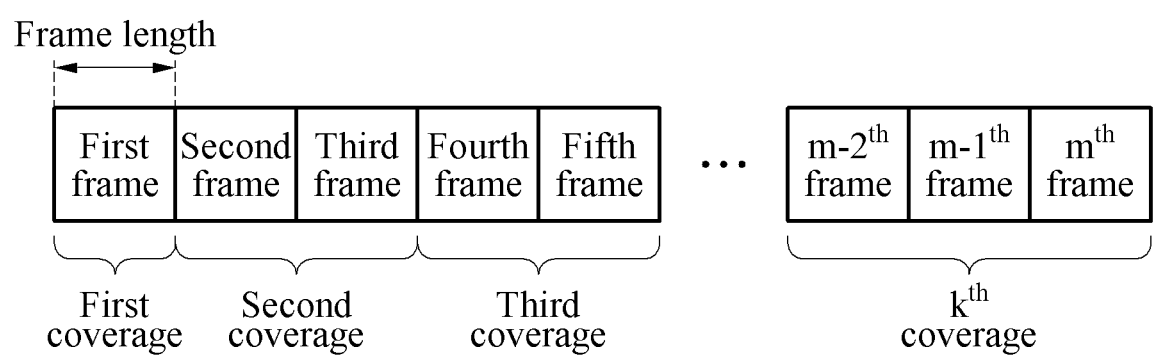
FIG. 3 is a diagram illustrating an example of a beam allocation time schedule (BATS) according to an example embodiment.
Figure 4:
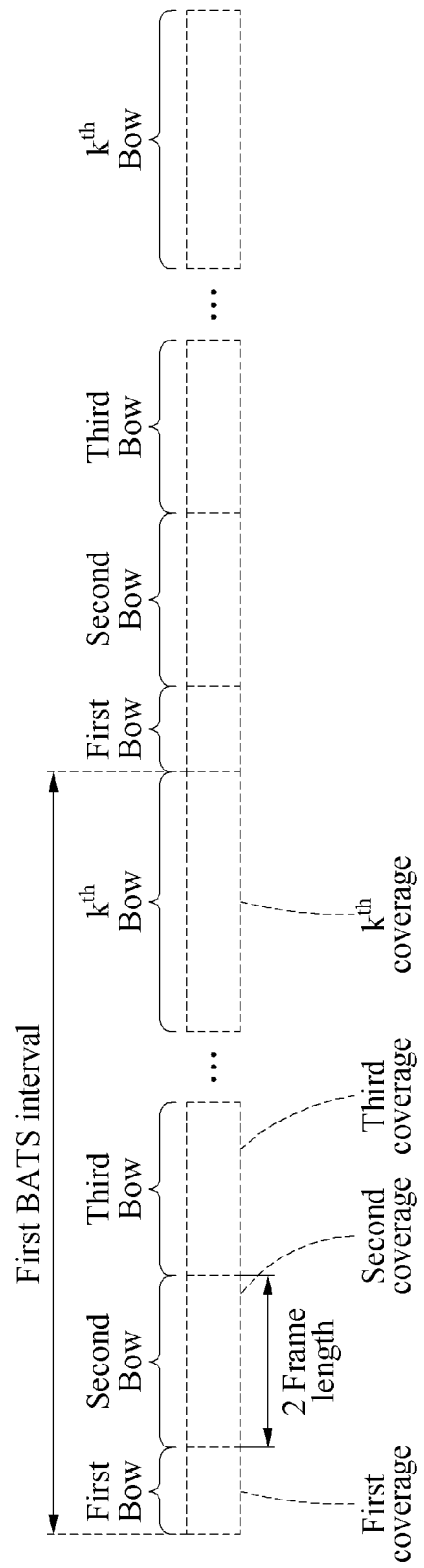
FIG. 4 is a diagram illustrating an example of a beam open window (BOW) according to an example embodiment.

FIG. 1 is a diagram illustrating an example of a communication system according to an example embodiment. FIG. 2 is a diagram illustrating an example of operations of a ground station and a satellite illustrated in FIG. 1. FIG. 3 is a diagram illustrating an example of a beam allocation time schedule (BATS) according to an example embodiment. FIG. 4 is a diagram illustrating an example of a beam open window (BOW) according to an example embodiment.

Referring to FIGS. 1 through 4, a communication system 10 includes a satellite 100 and a central station, for example, a ground station 200.

The satellite 100 may provide a communication service to a plurality of coverages, for example, first to kth coverages as illustrated, through at least one satellite payload. Herein, k denotes a natural number greater than or equal to 1. For example, a user terminal included in a coverage may receive a communication service through the satellite 100.

The satellite 100 may provide a communication service to a plurality of coverages by performing beam hopping or switching temporally and spatially based on a BATS. The BATS may be shared between the satellite 100 and the ground station 200.

The satellite 100 may receive a plurality of frames, for example, first to mth frames as illustrated, that is transmitted from the ground station 200. For example, the satellite 100 may successively receive the plurality of frames, each time a frame is transmitted from the ground station 200. In this example, respective lengths of the plurality of frames may be the same. Herein, m denotes a natural number greater than or equal to 1.

The satellite 100 may then perform beam hopping on a single beam based on a BOW according to the BATS to allocate a beam to each of the plurality of coverages, and thus transmit one or more frames to the plurality of coverages. Herein, the beam may be a beam with a set or fixed bandwidth or frequency range.

For example, as illustrated in FIG. 2, the satellite 100 may allocate a beam to a first coverage through a first BOW, which corresponds to a time interval corresponding to a length of a first frame (or a length of a single frame), to transmit the first frame to the first coverage. The satellite 100 may allocate a beam to a second coverage through a second BOW, which corresponds to a time interval corresponding to a length of a second frame and a third frame (or a double length of a single frame), to transmit the second frame and the third frame to the second coverage. The satellite 100 may allocate a beam to a kth coverage through a kth BOW, which corresponds to a time interval corresponding to a length of an m−2th frame, an m−1th frame, and an mth frame (or a triple length of a single frame), to transmit the m−2th frame, the m−1th frame, and the mth frame to the kth coverage.

Herein, a BATS refers to a time schedule set between a coverage and a frame corresponding to the coverage such that the satellite 100 may allocate a beam to the coverage, and a period of the BATS may be repeated regularly.

In addition, a BOW refers to a time interval in which a beam is open for the satellite 100 to transmit, to a coverage, a frame transmitted from the ground station 200, and corresponds to an integral multiple of a length of a single frame. A BOW may include a plurality of BOWs respectively corresponding to a plurality of coverages, and may also be referred to as a beam switching window (BSW).

That is, the satellite 100 may increase a beam allocation time for a coverage to which a relatively greater number of users is distributed among a plurality of coverages and decrease a beam allocation time for a coverage to which a relatively smaller number of users is distributed among the plurality of coverages by repeatedly performing beam opening and closing operations, or beam hopping, through a BOW based on a BATS, and may thus provide a communication service with an improved frequency efficiency.

The ground station 200 may include a gateway 300. The gateway 300 may be a communication apparatus configured to perform communication between the satellite 100 and the ground station 200.

The gateway 300 may synchronize the BATS between the satellite 100 and the ground station 200 based on a reception time and a detection time of a frame to be received by the ground station 200 and track a departure from the synchronized BATS in order to accurately provide a communication service through the satellite 100. Herein, a reception time and a detection time of a frame indicate a time at which the frame is received and a time at which the frame is detected, respectively.

That is, the gateway 300 may synchronize the BATS between the satellite 100 and the ground station 200 and track a departure from the synchronized BATS, only using a reception time and a detection time of a frame, thereby synchronizing the BATS between the satellite 100 and the ground station 200 and maintaining the synchronized BATS without increasing a hardware complexity. Through this, a communication service may be provided more accurately.

Figure 5:
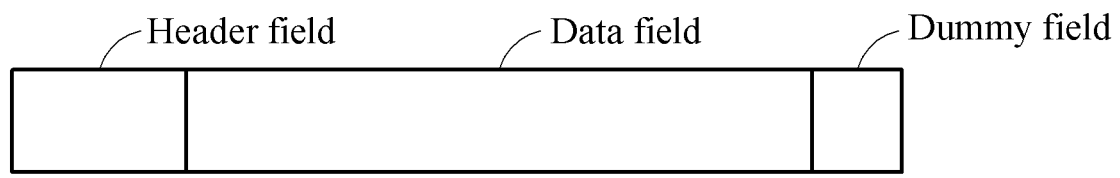
FIG. 5 is a diagram illustrating an example of a frame illustrated in FIG. 3.
Figure 6:
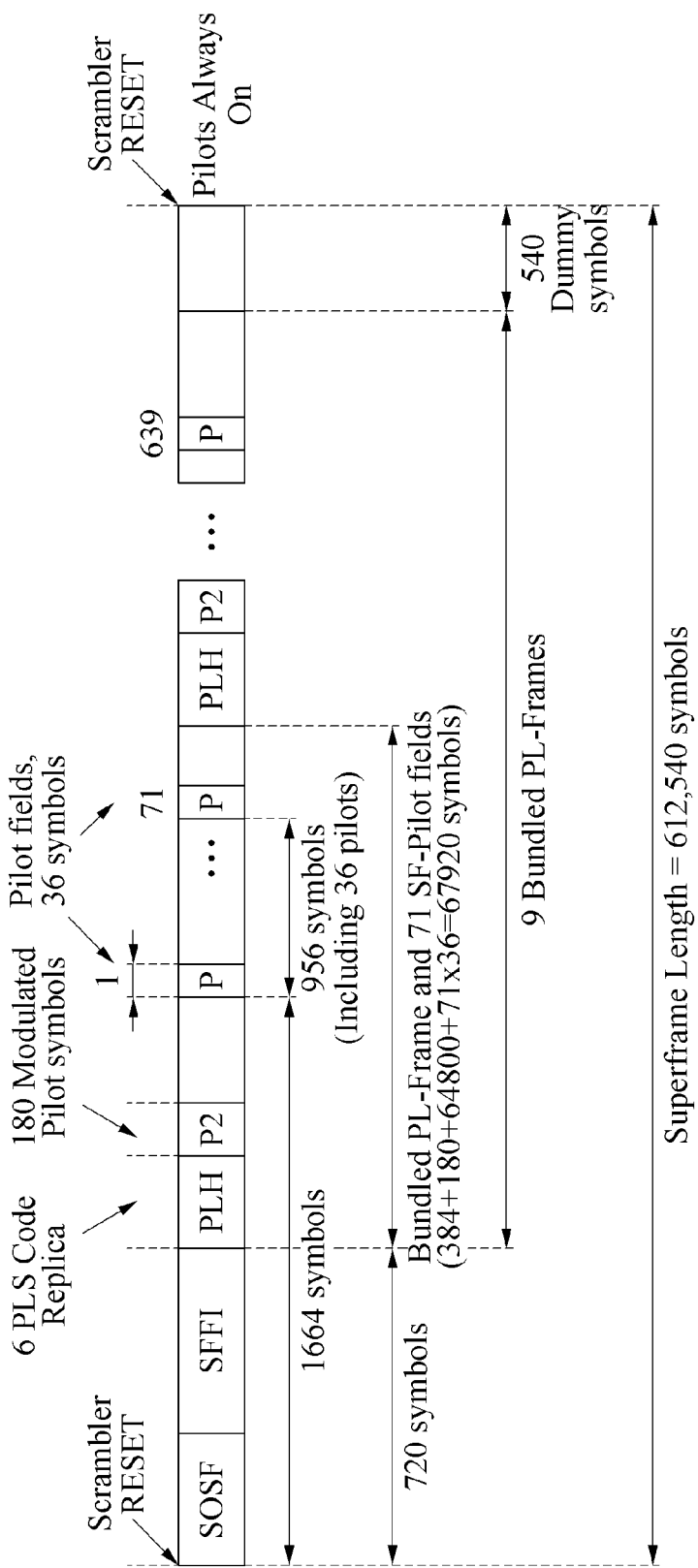
FIG. 6 is a diagram illustrating another example of a frame illustrated in FIG. 3.

FIG. 5 is a diagram illustrating an example of a frame illustrated in FIG. 3, and FIG. 6 is a diagram illustrating a detailed example of a frame illustrated in FIG. 5.

FIG. 5 illustrates a structure of a frame to be transmitted from the gateway 300 to the satellite 100. The frame may have a set or fixed length, for example, a set or fixed number of symbols of the frame, and includes a header field, a data field, and a dummy field. For example, the header field may include information associated with an index of the frame, and the data field may include data. The dummy field may be a protection period for a BOW transition period. Herein, the information associated with the index of the frame may be information used to detect the index of the frame, and the data may be multiplexed data.

As illustrated in FIG. 6, a frame may be embodied in a digital video broadcasting (DVB)-satellite 2nd generation extension superframe (S2x SF) (DVB-S2x SF) format 2 frame structure. The DVB-S2x SF format 2 frame structure may include a start of superframe (SOSF), a superframe format indicator (SFFI), and a plurality of bundled physical layer (PL) frames and dummy symbols. The SOSF and the SFFI may correspond to a header field, the bundled PL frames may correspond to a data field, and the dummy symbols may correspond to a dummy field.

The SOSF may include information indicating a start of a superframe, and include 270 symbols. For example, the SOSF may be generated based on a sequence that is shared and known between transmission and reception to detect an index of a frame. The sequence may be modulated and changed based on 256 SOSF indices.

The SFFI may include 4-bit superframe format information, and include 450 symbols.

In addition, a single frame may include 9 bundled PL frames which include a physical layer header (PLH), P2, data, and pilot (P) and include 67,920 symbols.

The dummy symbols may include 540 symbols.

As described above, the gateway 300 may synchronize a BATS between the satellite 100 and the ground station 200 only using a reception time and a detection time of a frame in the illustrated frame structure, and track a departure from the synchronized BATS.

Figure 7:
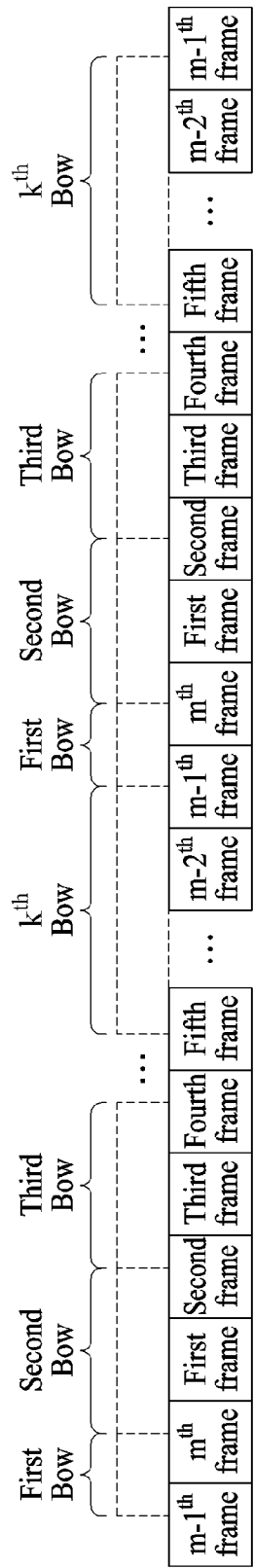
FIG. 7 is a diagram illustrating an example of an asynchronization of a BATS illustrated in FIG. 3.
Figure 8:
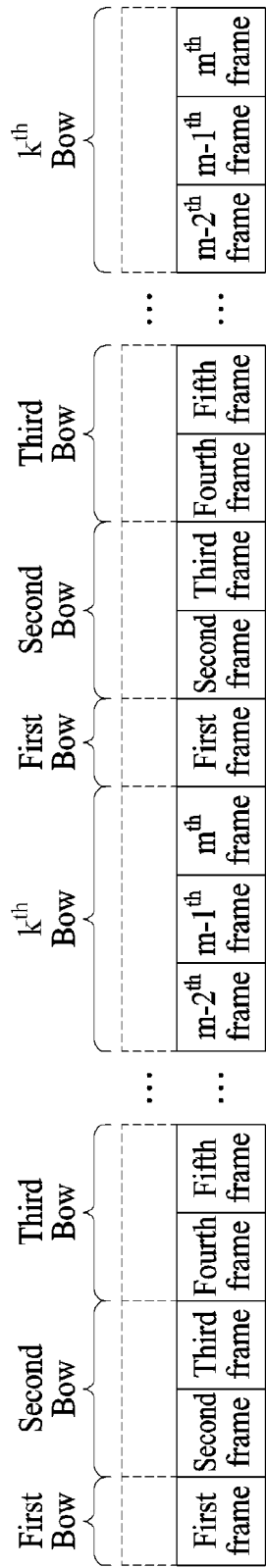
FIG. 8 is a diagram illustrating an example of a synchronization of a BATS illustrated in FIG. 3.

FIG. 7 is a diagram illustrating an example of an asynchronization of a BATS illustrated in FIG. 3, and FIG. 8 is a diagram illustrating an example of a synchronization of BATS illustrated in FIG. 3.

The satellite 100 may automatically operate based on a BATS, and the ground station 200 may transmit a frame to the satellite 100 based on the BATS of the satellite 100.

When the ground station 200 fails to transmit a frame not in an operating time of the satellite 100 based on the BATS, the frame transmitted from the ground station 200 may not be transmitted to a coverage on the BATS.

For example, in a case in which the ground station 200 transmits, to the satellite 100, a first frame to be transmitted to a first coverage when the satellite 100 allocates a beam to a second coverage corresponding to a second BOW through the second BOW, the first frame may not be transmitted to the first coverage, but to the second coverage, through the satellite 100.

That is, the BATS between the satellite 100 and the ground station 200 may need to be synchronized such that a frame transmitted from the ground station 200 based on the BATS is transmitted to an appropriate corresponding coverage through the satellite 100.

Figure 9:
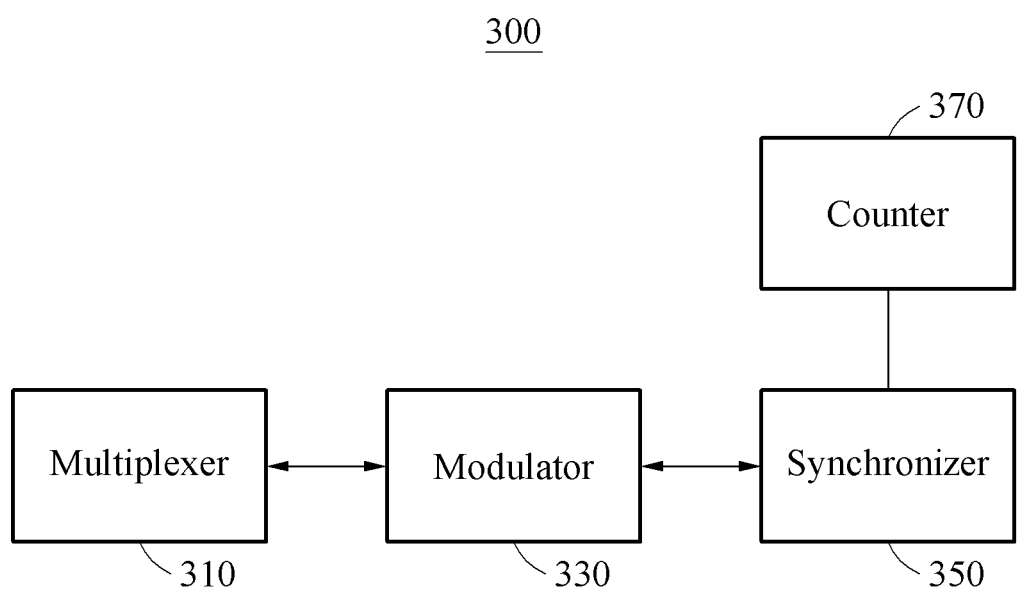
FIG. 9 is a diagram illustrating an example of a gateway illustrated in FIG. 1.
Figure 10:
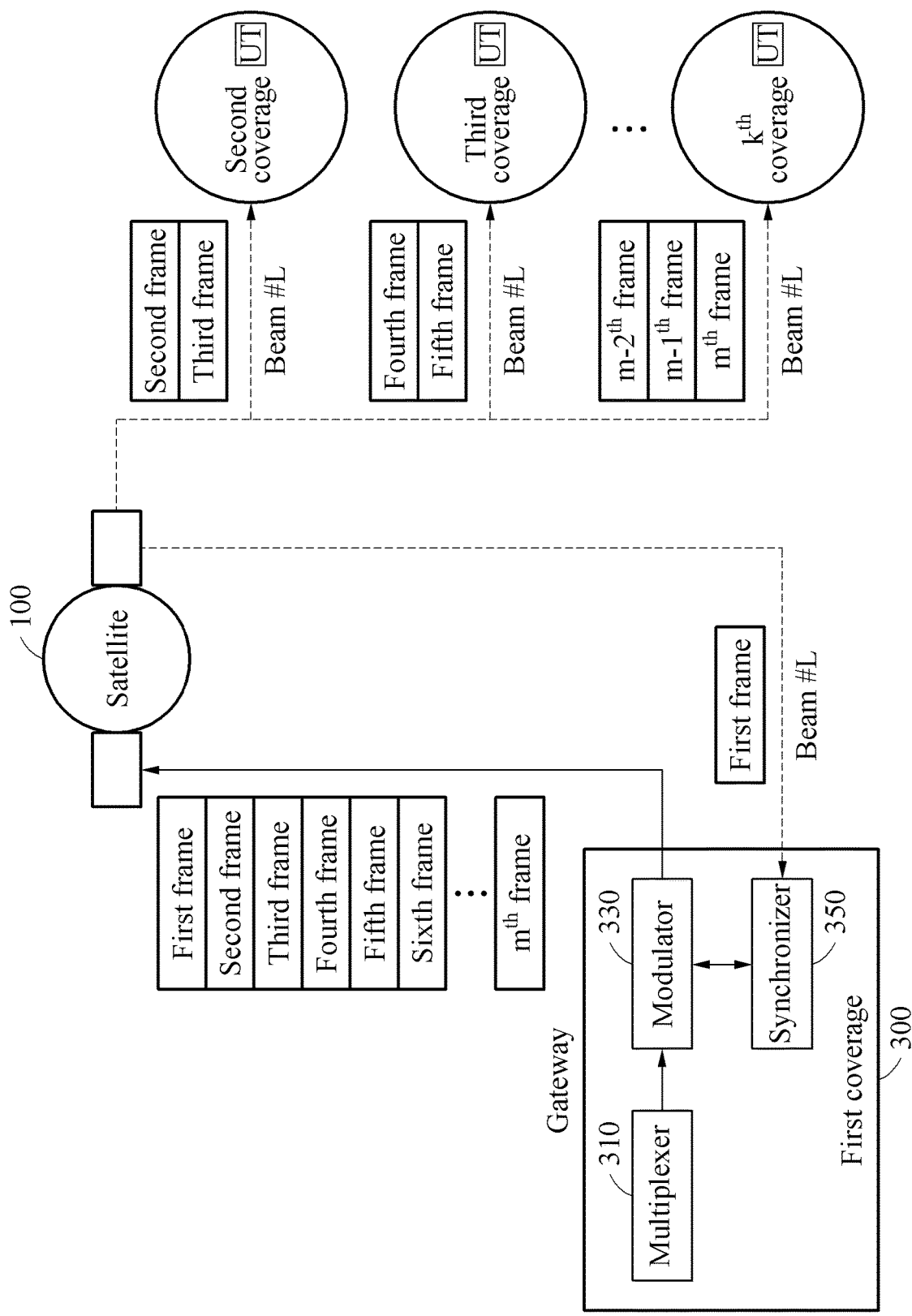
FIG. 10 is a diagram illustrating an example of operations of a modulator and a synchronizer illustrated in FIG. 9.

FIG. 9 is a diagram illustrating an example of a gateway illustrated in FIG. 1, and FIG. 10 is a diagram illustrating an example of operations of a modulator and a synchronizer illustrated in FIG. 9.

Referring to FIGS. 9 and 10, the gateway 300 includes a multiplexer 310, a modulator 330, and a synchronizer 350.

The multiplexer 310 may multiplex data to be included in a frame to be transmitted to a plurality of coverages, for example, first to kth coverages as illustrated, based on a BATS. For example, the multiplexer 310 may multiplex the data for each frame. The data may be at least one of satellite broadcasting data or satellite communication data used to provide a communication service.

The modulator 330 may transmit a plurality of frames, for example, first to mth frames as illustrated, to the satellite 100 based on the BATS between the satellite 100 and the ground station 200. The modulator 330 may be a forward link modulation module (FLM), and perform such a transmitting operation in accordance with a control command of the synchronizer 350.

To synchronize the BATS between the satellite 100 and the ground station 200, the modulator 330 may transmit, to the satellite 100, the plurality of frames, for example, the first to mth frames, that does not include data based on the BATS. Herein, the plurality of frames, for example, the first to mth frames, may not include data.

For example, before transmitting a data frame including actual traffic data, the modulator 330 may transmit, to the satellite 100, a transmission frame train that does not include data in a bundled PL frame. The transmission frame train may indicate a plurality of frames corresponding to one period of the BATS.

When the BATS between the satellite 100 and the ground station 200 is synchronized, the modulator 330 may perform modulation such that data multiplexed by the multiplexer 310 is included in a frame, and transmit the plurality of frames, for example, the first through mth frames, to the satellite 100 based on the synchronized BATS. Herein, the first through mth frames may include the data, and may also be referred to as a plurality of data frames.

For example, the modulator 330 may generate a transmission data frame train including the modulated data in the bundled PL frame. The transmission data frame train may indicate a plurality of data frames corresponding to one period of the BATS.

The synchronizer 350 may synchronize the BATS between the satellite 100 and the ground station 200. The synchronizer 350 may be a forward link reference reception module (FRM).

For example, the synchronizer 350 may synchronize the BATS between the satellite 100 and the ground station 200 by adjusting a time offset between the satellite 100 and the ground station 200 based on a reception time and a detection time of one or more frames to be received through a BOW allocated to the ground station 200 in a first BATS interval. Herein, the time offset may be a transmission timing error, which is a time variation in a frame transmission time between the satellite 100 and the ground station 200.

The synchronizer 350 may estimate a departure from the synchronized BATS.

For example, after the synchronization, the synchronizer 350 may track a departure from the synchronized BATS based on an allowable time offset range during transmission of the plurality of frames. The allowable time offset range may be a reference range used to determine a maintenance of the synchronized BATS or a departure from the synchronized BATS. The allowable time offset range may be a time range corresponding to a length of a header field of a frame and half a length of a dummy field of the frame.

A counter 370 may obtain a reception time and a detection time of one or more frames to be received through a BOW allocated to the ground station 200. Although it is illustrated in FIG. 9 that the counter 370 is positioned outside the synchronizer 350, examples are not limited thereto. According to an example, the counter 370 may be positioned inside the synchronizer 350.

For convenience of description hereinafter, it is assumed that a first coverage of a BATS is set to be the ground station 200, and the satellite 100 allocates a beam to the ground station 200 which is the first coverage through a first BOW.

Figure 11:
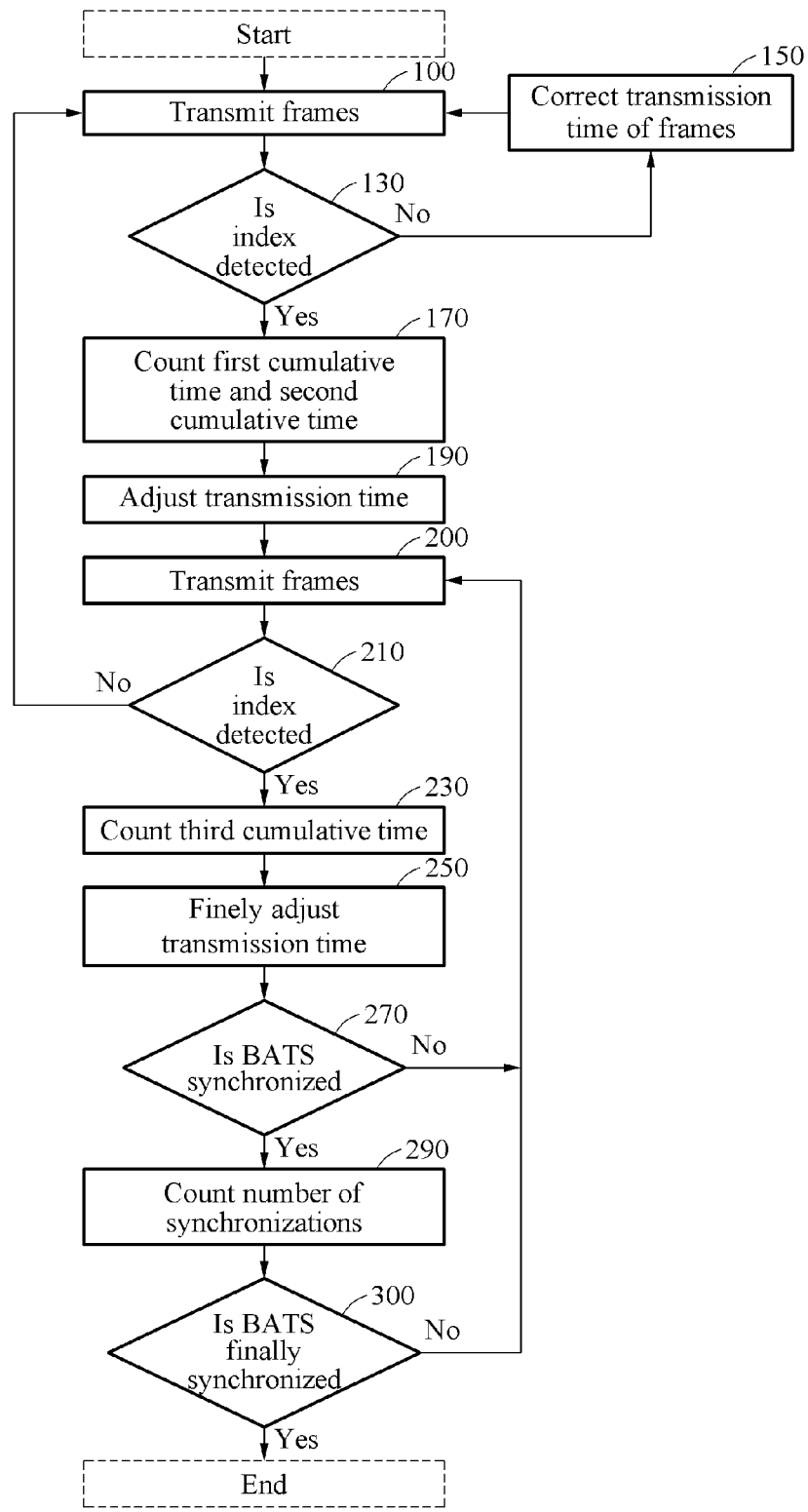
FIG. 11 is a flowchart illustrating an example of a synchronization performed by a gateway illustrated in FIG. 1.
Figure 12:
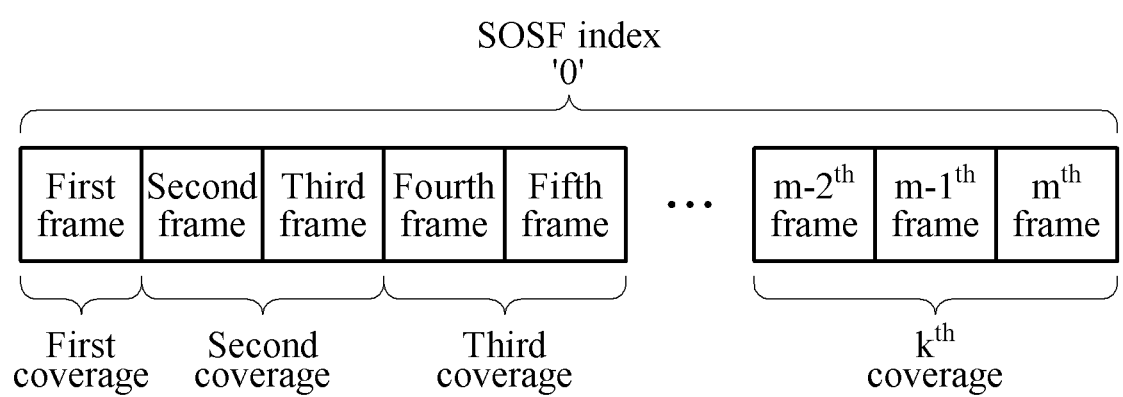
FIG. 12 is a diagram illustrating an example of an index of a first plurality of frames according to an example embodiment.
Figure 13:
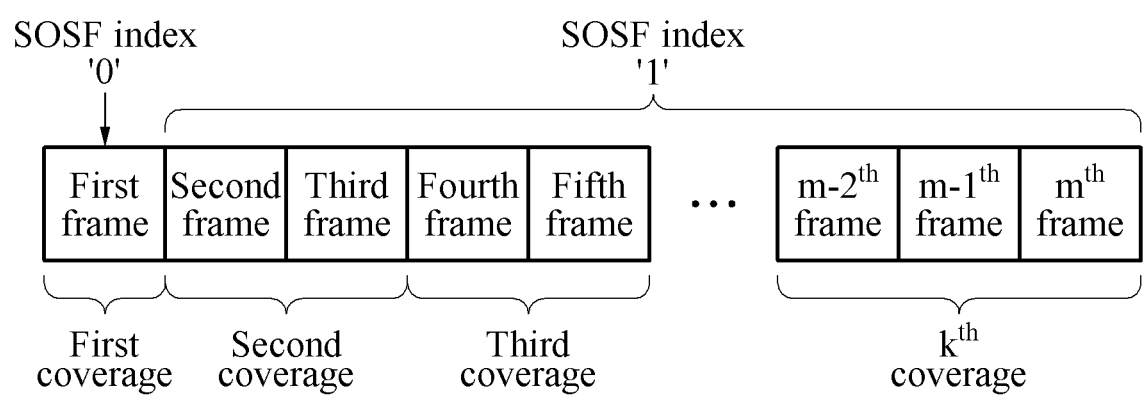
FIG. 13 is a diagram illustrating an example of an index of a second plurality of frames according to an example embodiment.
Figure 14:
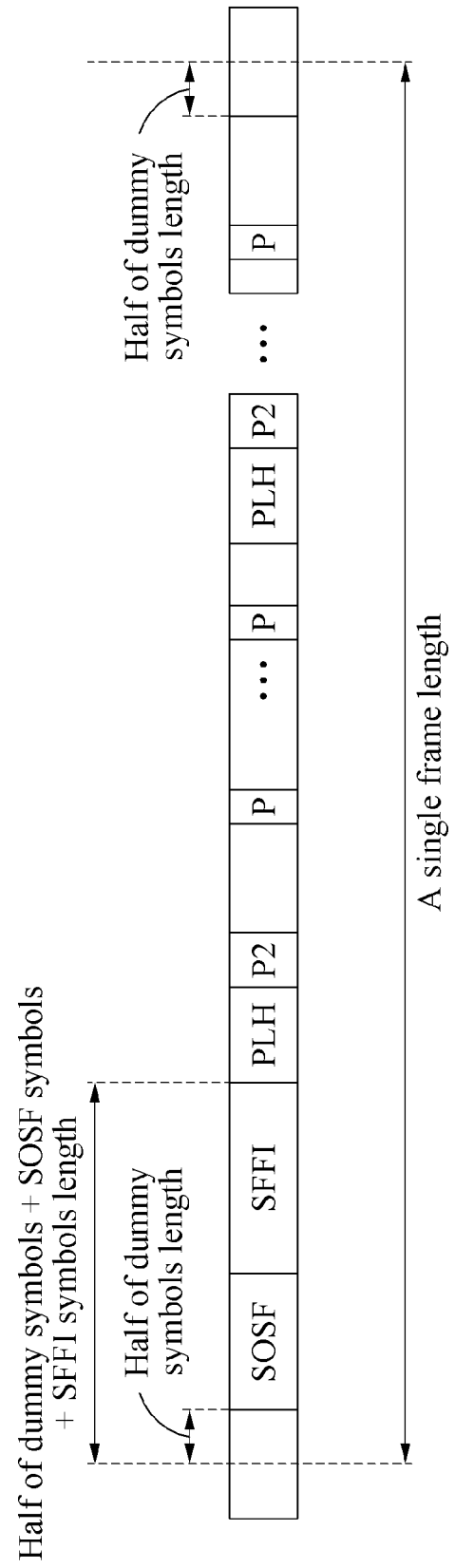
FIG. 14 is a diagram illustrating an example of a desirably synchronized BATS according to an example embodiment.

FIG. 11 is a flowchart illustrating an example of a BATS synchronizing method performed by a gateway illustrated in FIG. 1. FIG. 12 is a diagram illustrating an example of an index of a first plurality of frames according to an example embodiment. FIG. 13 is a diagram illustrating an example of an index of a second plurality of frames according to an example embodiment. FIG. 14 is a diagram illustrating an example of a desirably synchronized BATS according to an example embodiment.

Referring to FIGS. 11 through 14, the synchronizer 350 may synchronize a BATS between the satellite 100 and the ground station 200 by adjusting a time offset between the satellite 100 and the ground station 200 based on a reception time and a detection time of one or more frames to be received through a BOW allocated to the ground station 200 in a first BATS interval.

Referring to FIG. 11, in operation 100, the modulator 330 successively transmits a first plurality of frames corresponding to the first BATS interval. As illustrated in FIG. 12, indices of the first plurality of frames may be all the same that are detectable in the ground station 200. For example, SOSF indices of the first plurality of frames may all be 0.

In operation 130, the synchronizer 350 receives first one or more frames among the first plurality of frames through the BOW allocated to the ground station 200, and determines whether an index of the first one or more frames is detected.

For example, after the modulator 330 successively transmits the first plurality of frames in the first BATS interval, the synchronizer 350 may measure an average noise power during a certain period of time when no signal is received. In this example, when a signal level corresponding to approximately 1.7 times the average noise power is measured, the synchronizer 350 may determine that a frame is received. In addition, when both a start and an end of a header field of the frame are received, the synchronizer 350 may determine that an index of the frame is detected.

In operation 150, when the index of the frames is not detected, the synchronizer 350 corrects a transmission time of the first plurality of frames. For example, the synchronizer 350 may generate a control signal that adjusts the transmission time of the first plurality of frames, forward and backward, by a length of a header field of a frame. The synchronizer 350 may then transmit, to the modulator 330, the control signal for the transmission time such that the modulator 330 may change the transmission time of the first plurality of frames based on the control signal and transmit the first plurality of frames based on the changed transmission time.

In operation 170, when the index of the frames is detected, the synchronizer 350 counts a first cumulative time from the transmission time of the first plurality of frames to a detection time of the first one or more frames, through the counter 370. When transmitting the frames, the synchronizer 350 may obtain, as the transmission time of the first plurality of frames, a transmission time of a first frame that is initially transmitted among the first plurality of frames.

In addition, in operation 170, the synchronizer 350 counts a second cumulative time from a reception time of the first one or more frames to the detection time of the first one or more frames, through the counter 370.

In operation 190, the synchronizer 350 calculates a first time offset based on a difference between the first cumulative time and the second cumulative time and adjusts the first time offset to synchronize the BATS between the satellite 100 and the ground station 200.

For example, the synchronizer 350 may calculate the first time offset by excluding a round trip delay (RTD) of the satellite 100 from the difference between the first cumulative time and the second cumulative time. The synchronizer 350 may adjust, by the first time offset, a transmission time of a second plurality of frames corresponding to a second BATS interval.

The synchronizer 350 may generate a control signal that adjusts the transmission time of the second plurality of frames by putting the transmission time forward or backward by the first time offset.

The synchronizer 350 may then transmit the control signal to the modulator 330 such that the modulator 330 may adjust the transmission time of the second plurality of frames forwards or backwards by the first time offset based on the control signal to transmit the second plurality of frames to the satellite 100 based on the adjusted transmission time. For example, the modulator 330 may adjust the transmission time of the second plurality of frames backwards through an operation such as, for example, transmission data buffering, based on the control signal.

That is, the synchronizer 350 may synchronize the BATS between the satellite 100 and the ground station 200 using two count values through a transmission frame train corresponding to one period of the BATS, without increasing a hardware complexity, and thus accurately transmit a frame to a coverage based on the synchronized BATS.

The synchronizer 350 may finely adjust a second time offset in frame transmission occurring in a second BATS interval based on a reception time and a detection time of second one or more frames to be received through a BOW allocated to the ground station 200 in the second BATS interval, and thus more accurately synchronize the BATS between the satellite 100 and the ground station 200.

In operation 200, the modulator 330 transmits the second plurality of frames corresponding to the second BATS interval. For example, the modulator 330 may transmit the second plurality of frames under the control of the synchronizer 350, for example, based on the first time offset.

As illustrated in FIG. 12, an index of a first frame among the second plurality of frames may be an index that is detectable in the ground station 200, and indices of remaining frames among the second plurality of frames excluding the first frame may be a same index that is not detectable in the ground station 200. For example, an SOSF index of the first frame may be 0, which is the same as an SOSF index of the first plurality of frames, and SOSF indices of the remaining frames may all the same as to 1.

In operation 210, the synchronizer 350 receives the second one or more frames among the second plurality of frames through the BOW allocated to the ground station 200, and determines whether an index of the second one or more frames is detected. Herein, the synchronizer 350 may determine whether the frames are received and detected, in substantially the same way as performed in operation 130.

When the index of the frames is not detected, the synchronizer 350 determines that the BATS between the satellite 100 and the ground station 200 is not synchronized, and reperforms operations 100 through 210.

In operation 230, when the index of the frames is detected, the synchronizer 350 counts a third cumulative time from a reception time of the second one or more frames to a detection time of the second one or more frames, through the counter 370.

The synchronizer 350 calculates the second time offset based on the third cumulative time. For example, the second time offset may indicate a difference between an allowable time offset range and the third cumulative time.

In operation 250, the synchronizer 350 finely adjusts a transmission time of a third plurality of frames corresponding to a third BATS interval using the second time offset, and thus more accurately synchronizes the BATS. For example, the synchronizer 350 may use the modulator 330 to adjust, forwards or backwards, the transmission time of the third plurality of frames by the second time offset, and transmit the third plurality of frames to the satellite 100. Thus, the synchronizer 350 may allow the satellite 100 to more accurately transmit a frame received based on the BATS to a coverage corresponding to the received frame.

That is, the synchronizer 350 may more accurately synchronize the BATS between the satellite 100 and the ground station 200 using a single count value through a transmission frame train corresponding to two periods of the BATS without increasing a hardware complexity, and thus allow the satellite 100 to more accurately transmit a frame received based on the BATS to a coverage corresponding to the received frame.

In operation 270, the synchronizer 350 determines whether the BATS between the satellite 100 and the ground station 200 is synchronized based on the allowable time offset range in the second BATS interval.

For example, the synchronizer 350 may determine whether the BATS between the satellite 100 and the ground station 200 is synchronized by comparing the third cumulative time and the allowable time offset range in the second BATS interval.

For example, when a cumulative time is greater than the allowable time offset range, the synchronizer 350 may determine that the BATS between the satellite 100 and the ground station 200 is not accurately synchronized, and reperform operations 200 through 270 for a subsequent BATS interval. Herein, a current interval for which the BATS is determined to be synchronized is the second BATS interval, the subsequent BATS interval may be a third BATS interval.

In operation 290, when the cumulative time is less than or equal to the allowable time offset range, the synchronizer 350 determines that the BATS between the satellite 100 and the ground station 200 is accurately synchronized, and counts the number of synchronizations. Herein, the number of synchronizations may indicate the number of times that the BATS between the satellite 100 and the ground station 200 is accurately synchronized through operation 250.

In operation 300, the synchronizer 350 determines whether the BATS between the satellite 100 and the ground station 200 is finally synchronized by comparing the counted number of synchronizations and a preset number of synchronizations.

When the counted number of synchronizations is less than the preset number of synchronizations, the synchronizer 350 determines that the BATS between the satellite 100 and the ground station 200 is not sufficiently synchronized, and repeatedly performs operations 200 through 300 for one or more subsequent BATS intervals.

When the counted number of synchronizations is greater than the preset number of synchronizations, the synchronizer 350 determines that the BATS between the satellite 100 and the ground station 200 is desirably synchronized and terminates a synchronization operation described above.

As described above, the gateway 300 may finely adjust the second BATS interval and each of BATS intervals subsequent to the second BATS interval, and determine whether the BATS is synchronized.

When the BATS between the satellite 100 and the ground station 200 is desirably synchronized as illustrated in FIG. 14, a frame may be matched to a BOW with a time offset corresponding to a time range corresponding to half a length of a dummy field of the frame.

When the synchronization operation is terminated, the synchronizer 350 may transmit a plurality of data frames to the satellite 100 through the modulator 330 based on the synchronized BATS to provide a communication service.

Figure 15:
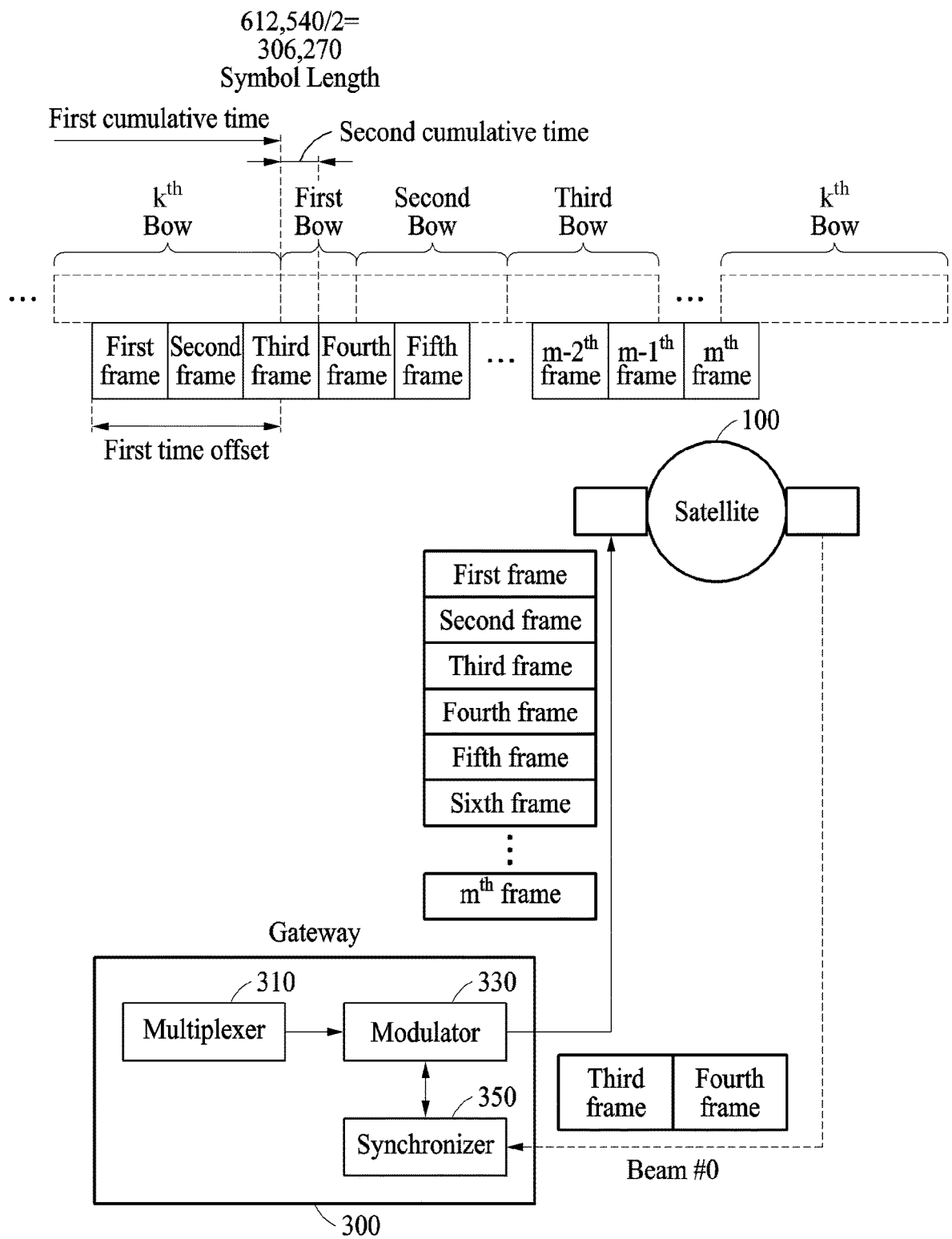
FIG. 15 is a diagram illustrating an example of a time offset according to an example embodiment.

FIG. 15 is a diagram illustrating an example of a time offset according to an example embodiment.

Referring to FIG. 15, in a case in which a symbol rate of a frame is 230 megahertz (MHz) and the frame is in a DVB-S2sSF format 2 frame structure, the synchronizer 350 may receive symbols by a multiple of 2, and thus a length of a single superframe may be 2663.21739 microseconds ($\mu s$)≅2663 $\mu s$ (2×OSF rate) and a length of a header fielder required for detecting the frame may be approximately 6 $\mu s$.

When the ground station 200 initially transmits a first frame in a first BATS interval, and frames received by the ground station 200 corresponds to symbols which are from symbols corresponding to a middle portion of a third frame to symbols corresponding to a middle portion of a fourth frame, a first cumulative time (A) from a transmission time of the first frame to a detection time of the fourth frame may be 250 milliseconds (ms)+3×2663 $\mu s$ and a second cumulative time (B) from a reception time of the third frame to the detection time of the fourth frame may be 1331.5 µs+6 µs=1337.5 µs, in which 250 ms may be a time corresponding to an RTD. The RTD may have an error range of approximately 550 µs.

That is, a first time offset between the satellite 100 and the ground station 200 may be a time (256,6575 µs−250,000 µs=6,6575 µs) obtained by excluding the RTD from a difference (A−B=256,6575 µs) between the first cumulative time (A) and the second cumulative time (B), which corresponds to approximately 2.5 times a length of a superframe.

The times described above may be converted to counter ticks of a multiple of 2.

Figure 16:
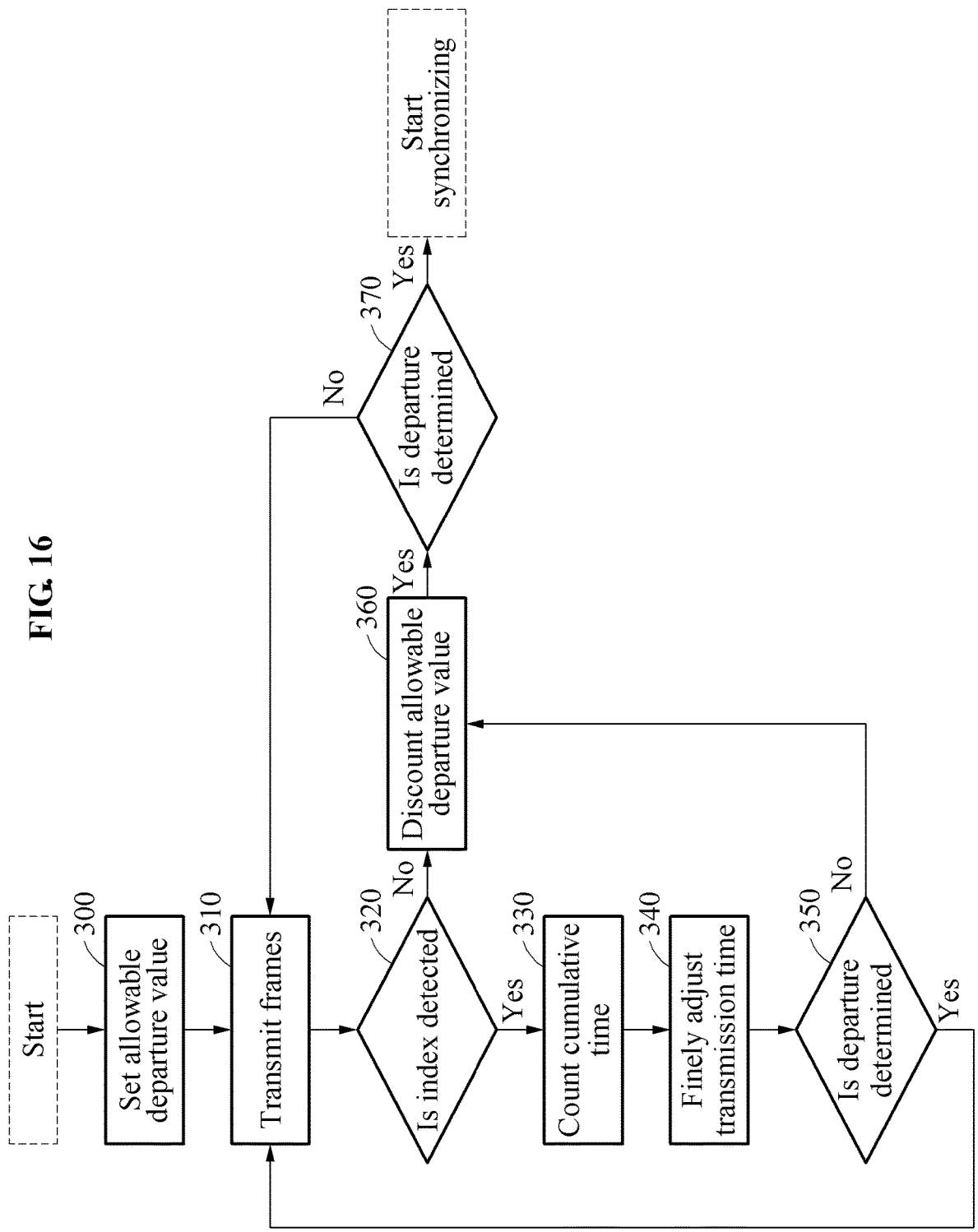
FIG. 16 is a flowchart illustrating an example of a method of tracking a departure from a synchronized BATS that is performed by a gateway illustrated in FIG. 1.

FIG. 16 is a flowchart illustrating an example of a method of tracking a departure from a synchronized BATS that is performed by a gateway illustrated in FIG. 1.

Referring to FIG. 16, the synchronizer 350 tracks a departure from a synchronized BATS based on an allowable time offset range during transmission of a plurality of data frames transmitted from the ground station 200.

In operation 300, the synchronizer 350 sets an allowable departure value. For example, the allowable departure value may be used as a reference to determine whether there is a departure from the synchronized BATS.

In operation 310, the synchronizer 350 distinguishes an index of a first data frame among the plurality of data frames and an index of a remaining data frame among the plurality of data frames excluding the first data frame, and transmits the plurality of data frames according to the distinguished indices, through the modulator 330. Herein, the index of the first data frame may be the same as an index of the first frame in operation 200 described above with reference to FIG. 11, and the index of the remaining data frame may be the same as the index of the remaining frames in operation 200 described above with reference to FIG. 11.

In operation 320, the synchronizer 350 determines whether an index of one or more data frames received through a BOW allocated to the ground station 200 in one BATS interval for which the indices are distinguished is detected or not. Herein, the synchronizer 350 may determine whether the frames are received and detected, in substantially the same way as performed in operation 130 described above with reference to FIG. 11.

In operation 360, when the index of the data frames is not detected, the synchronizer 350 determines a departure from the synchronized BATS and discounts the allowable departure value.

In operation 330, when the index of the data frames is detected, the synchronizer 350 counts a cumulative time from a reception time of the one or more data frames to a detection time of the one or more data frames, through the counter 370.

The synchronizer 350 calculates a time offset between the satellite 100 and the ground station 200 in the BATS interval for the one or more data frames based on the cumulative time. For example, the time offset between the satellite 100 and the ground station 200 in the one BATS interval may indicate a difference between an allowable time offset range and the cumulative time associated with the one or more data frames.

In operation 340, the synchronizer 350 finely adjusts a reception time of a plurality of data frames corresponding to a subsequent BATS interval using the time offset between the satellite 100 and the ground station 200 in the one BATS interval, and thus more accurately synchronizes the synchronized BATS.

In operation 350, the synchronizer 350 determines a departure from the synchronized BATS by comparing, to the allowable time offset range, the cumulative time associated with the one or more data frames.

In operation 360, when the cumulative time is greater than the allowable time offset range, the synchronizer 350 determines a departure from the synchronized BATS and discounts the allowable departure value.

When the cumulative time is less than the allowable time offset range, the synchronizer 350 determines no departure from the synchronized BATS and reperforms operations 310 through 350 on the subsequent BATS interval.

In operation 370, when the allowable departure value is discounted, the synchronizer 350 finally determines a departure from the synchronized BATS based on the discounted allowable departure value.

When the allowable departure value is greater than 0, the synchronizer 350 determines no final departure from the synchronized BATS and reperforms operations 310 through 370 for the subsequent BATS interval.

When the allowable departure value is less than or equal to 0, the synchronizer 350 determines the final departure from the synchronized BATS and reperforms operations 100 through 300 to synchronize the BATS between the satellite 100 and the ground station 200.

The components described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A communication method comprising:
    transmitting a plurality of frames based on a beam allocation time schedule (BATS) between a satellite and a ground station; and
    synchronizing the BATS based on a reception time and a detection time of one or more frames among the plurality of frames to be received through a beam open window (BOW) allocated to the ground station,
    transmitting a plurality of data frames including data based on the synchronized BATS; and
    tracking a departure from the synchronized BATS based on an allowable time offset range during transmission of the plurality of data frames,
    wherein the plurality of frames does not include data, and
    wherein the tracking comprises:
    determining whether one or more frames received through a BOW allocated to the ground station on the synchronized BATS are detected; and
    when the one or more frames are detected, determining a departure from the synchronized BATS by comparing, to the allowable time offset range, a cumulative time from a reception time of the one or more frames to a detection time of the one or more frames.

2. The communication method of claim 1, wherein the synchronizing comprises:
    adjusting a first time offset in frame transmission occurring in a first BATS interval based on a reception time and a detection time of first one or more frames to be received by the ground station through a BOW allocated to the ground station in the first BATS interval; and
    finely adjusting a second time offset in frame transmission occurring in a second BATS interval based on a reception time and a detection time of second one or more frames to be received by the ground station through a BOW allocated to the ground station in the second BATS interval.

3. The communication method of claim 2, wherein the transmitting comprises:
    transmitting a first plurality of frames corresponding to the first BATS interval; and
    transmitting a second plurality of frames corresponding to the second BATS interval,
    wherein indices of the first plurality of frames are all the same as to a first index, and
    an index of a first frame among the second plurality of frames is a second index, and indices of remaining frames among the second plurality of frames excluding the first frame are all the same as to a third index.

4. The communication method of claim 3, wherein the first index and the second index are detectable in the ground station.

5. The communication method of claim 4, wherein the first index and the second index are the same.

6. The communication method of claim 2, wherein the adjusting of the first time offset comprises:
    obtaining a transmission time of a first plurality of frames corresponding to the first BATS interval;
    counting a first cumulative time from the transmission time of the first plurality of frames to the detection time of the first one or more frames;
    counting a second cumulative time from the reception time of the first one or more frames to the detection time of the first one or more frames;
    calculating the first time offset based on a difference between the first cumulative time and the second cumulative time; and
    adjusting a transmission time of a second plurality of frames corresponding to the second BATS interval using the first time offset.

7. The communication method of claim 2, wherein the fine adjusting of the second time offset comprises:
    counting a third cumulative time from the reception time of the second one or more frames to the detection time of the second one or more frames;
    calculating the second time offset based on the third cumulative time; and
    adjusting a transmission time of a plurality of frames corresponding to a subsequent BATS interval using the second time offset.

8. The communication method of claim 2, wherein the synchronizing further comprises:
    determining whether the BATS is synchronized by comparing, to an allowable time offset range, a cumulative time from the reception time of the second one or more frames to the detection time of the second one or more frames.

9. The communication method of claim 8, wherein the second BATS interval includes a plurality of successive BATS intervals subsequent to the first BATS interval,
    wherein, in the plurality of BATS intervals, the fine adjusting and the determining of whether the BATS is synchronized are performed using a reception time and a detection time of one or more frames to be received through a BOW allocated to the ground station in the plurality of BATS intervals.

10. The communication method of claim 8, wherein the allowable time offset range is a time range to be determined based on a length of a header field of a frame and half a length of a dummy field of the frame.

11. A communication apparatus comprising:
a modulator configured to transmit a plurality of frames based on a beam allocation time schedule (BATS) between a satellite and a ground station; and
a synchronizer configured to synchronize the BATS based on a reception time and a detection time of one or more frames among the plurality of frames to be received through a beam open window (BOW) allocated to the ground station,
wherein the modulator is configured to transmit a plurality of data frames including data based on the synchronized BATS, and
the synchronizer is configured to track a departure from the synchronized BATS based on an allowable time offset range during transmission of the plurality of data frames,
wherein the plurality of frames does not include data, and
wherein the synchronizer is configured to:
determine whether one or more frames received through a BOW allocated to the ground station on the synchronized BATS are detected; and
when the one or more frames are detected, determine a departure from the synchronized BATS by comparing, to the allowable time offset range, a cumulative time from a reception time of the one or more frames to a detection time of the one or more frames.

12. The communication apparatus of claim 11, wherein the synchronizer is configured to:
adjust a first time offset in frame transmission occurring in a first BATS interval based on a reception time and a detection time of first one or more frames to be received by the ground station through a BOW allocated to the ground station in the first BATS interval; and
finely adjust a second time offset in frame transmission occurring in a second BATS interval based on a reception time and a detection time of second one or more frames to be received through a BOW allocated to the ground station in the second BATS interval.

13. The communication apparatus of claim 12, wherein the modulator is configured to:
transmit a first plurality of frames corresponding to the first BATS interval, and transmit a second plurality of frames corresponding to the second BATS interval,
wherein indices of the first plurality of frames are all the same as to a first index, and
an index of a first frame among the second plurality of frames is a second index, and indices of remaining frames among the second plurality of frames excluding the first frame are all the same as to a third index.

14. The communication apparatus of claim 12, wherein the synchronizer is configured to:
obtain a transmission time of a first plurality of frames corresponding to the first BATS interval;
count a first cumulative time from the transmission time of the first plurality of frames to the detection time of the first one or more frames;
count a second cumulative time from the reception time of the first one or more frames to the detection time of the first one or more frames;
calculate the first time offset based on a difference between the first cumulative time and the second cumulative time; and
adjust a transmission time of a second plurality of frames corresponding to the second BATS interval using the first time offset.

15. The communication apparatus of claim 12, wherein the synchronizer is configured to:
count a third cumulative time from the reception time of the second one or more frames to the detection time of the second one or more frames;
calculate the second time offset based on the third cumulative time; and
adjust a transmission time of a plurality of frames corresponding to a subsequent BATS interval using the second time offset.

16. The communication apparatus of claim 12, wherein the synchronizer is configured to:
determine whether the BATS is synchronized by comparing, to an allowable time offset range, a cumulative time from the reception time of the second one or more frames to the detection time of the second one or more frames,
wherein the allowable time offset range is determined based on a length of a header field of a frame and half a length of a dummy field of the frame, and
the second BATS interval includes a plurality of successive BATS intervals subsequent to the first BATS interval,
wherein, in the BATS intervals, the fine adjusting and the determining of whether the BATS is synchronized are performed using a reception time and a detection time of one or more frames to be received through a BOW allocated to the ground station in the BATS intervals.

* * * * *